United States Patent

Lee

[11] Patent Number: 5,713,602
[45] Date of Patent: Feb. 3, 1998

[54] SEAT BELT FOR A VEHICLE

[75] Inventor: Joo-Hun Lee, Anyang, Rep. of Korea

[73] Assignee: Kia Motors Corporation, Seoul, Rep. of Korea

[21] Appl. No.: 691,660

[22] Filed: Aug. 2, 1996

[30] Foreign Application Priority Data

Mar. 6, 1996 [KR] Rep. of Korea .................. 96-4136

[51] Int. Cl.⁶ ................................................ B60R 22/24
[52] U.S. Cl. ................................ 280/801.2; 280/808
[58] Field of Search ......................... 280/801.1, 801.2, 280/804, 808

[56] References Cited

U.S. PATENT DOCUMENTS

| | | | |
|---|---|---|---|
| 3,521,901 | 7/1970 | Wackym | 280/801.2 |
| 3,618,975 | 11/1971 | Bombach | 280/801.2 |
| 3,842,929 | 10/1974 | Wada et al. | 280/804 |
| 3,882,955 | 5/1975 | Kaneko et al. | 280/804 |
| 4,635,963 | 1/1987 | Higuchi et al. | 280/801.1 |
| 4,648,625 | 3/1987 | Lynch | 280/808 |
| 5,058,922 | 10/1991 | Long | 280/808 |

*Primary Examiner*—Paul N. Dickson

[57] ABSTRACT

A seat belt for a vehicle is disclosed including: a belt both ends of which are fixed to one side of a seat and a B-pillar of the body of the vehicle; a buckle installed in the opposite side of the seat to be engaged with a tongue plate; a height adjusting device installed on one side of a roof panel; and a supporting cable for connecting the belt crossing over the shoulder of a passenger and the height adjusting device.

4 Claims, 3 Drawing Sheets

SEAT BELT FOR A VEHICLE

FIELD OF THE INVENTION

The present invention relates to a seat belt of a vehicle, and more particularly, to a seat belt of a vehicle having a supporting cable for supporting the belt, so that a portion of the belt crossing over a shoulder of a passenger is slightly removed therefrom.

PRIOR ART

In general, a seat belt is installed in a seat of a vehicle to protect a passenger from collision or a sudden stop of the vehicle. The purpose of this kind of seat belt is to secure the body of the passenger to the seat of the vehicle, and thus prevent the passenger from coming into contact with the front window of the vehicle due to the force of the collision, thereby minimizing the physical injury.

The seat belt of the vehicle is structured in a manner that both ends of the belt are fixed respectively to one side of the seat and to one side of the vehicle. A tongue plate is installed movably at the center of the belt. A buckle, to which the tongue plate is inserted, is installed on the opposite side of the seat. Accordingly, as the passenger buckles up the tongue plate, the belt crosses over the waist and chest area of the passenger, thus securing the body of the passenger to the seat.

The conventional seat belt are placed behind the passenger and having the fixing parts on both sides. Thus, the belt presses against the shoulder of the passenger causing some discomfort.

SUMMARY OF THE INVENTION

To the solve the above-mention problem, an object of the invention is to provide a seat belt having a supporting cable for supporting the belt, so that a portion of the belt crossing over the shoulder of a passenger is slightly removed therefrom.

To achieve the object, the seat belt of the invention includes: a belt both ends of which are fixed to one side of a seat and a B-pillar of the body of the vehicle; a buckle installed in the opposite side of the seat to be engaged with a tongue plate; a height adjusting device installed on one side of a roof panel; and a supporting cable for connecting the seat belt crossing over the shoulder of a passenger and the height adjusting device.

BRIEF DESCRIPTION OF THE ATTACHED DRAWINGS

These and other objects, features and advantages of the present invention will become more apparent in light of the detailed description, appended claims, and attached drawings wherein:

DETAILED DESCRIPTION OF PREFERRED EMBODIMENT

With reference to the attached drawings, preferred embodiments will be described in detail.

Figure 1:
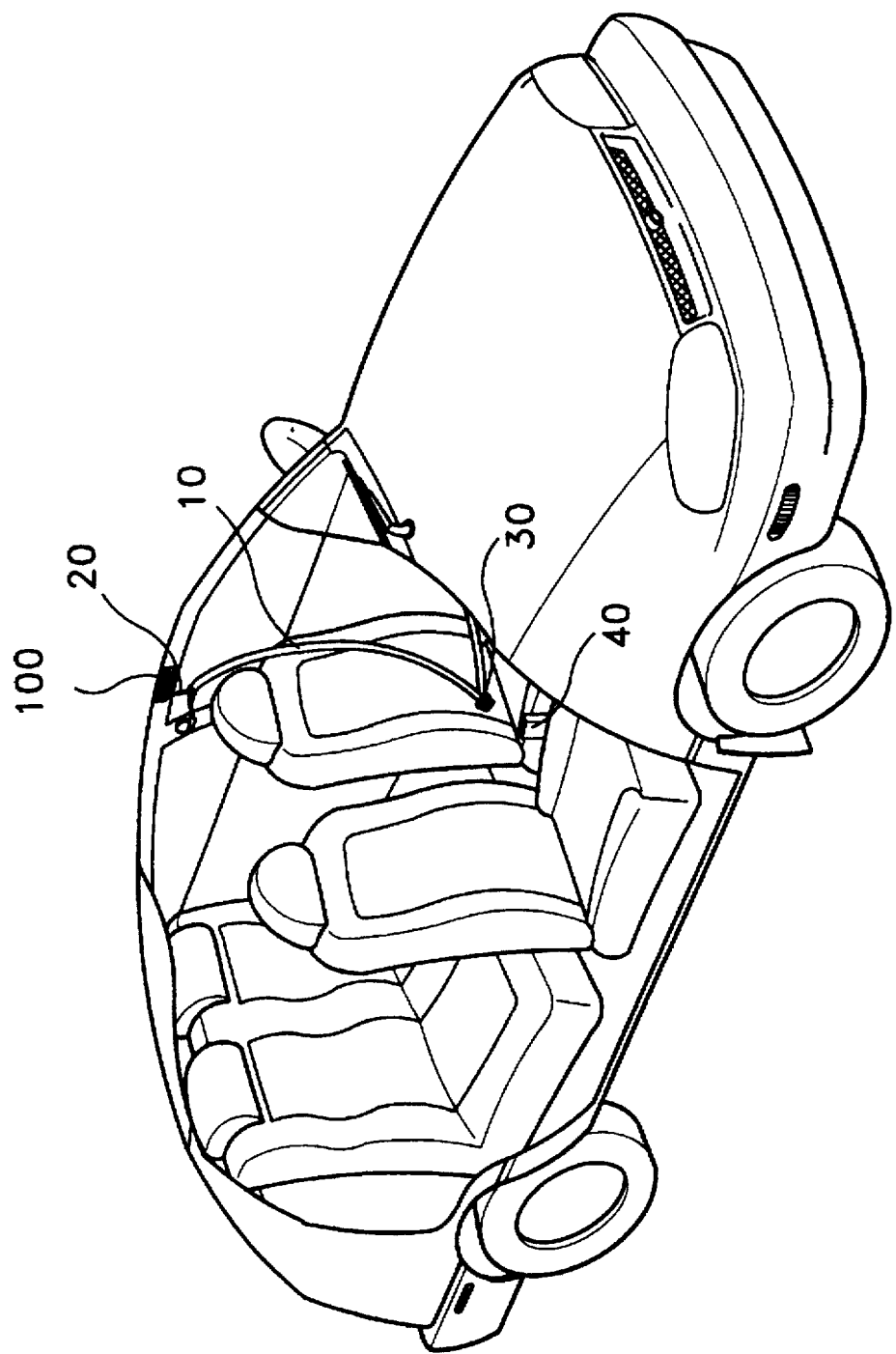
FIG. 1 is a perspective view of the installation of a seat belt in accordance with the invention.

As illustrated in FIG. 1, the seat belt for a vehicle of the invention includes a belt 10 whose both ends of which are respectively fixed to one side of a seat and a B-pillar of the body of the vehicle; a tongue plate 30 which is movably installed at the center of the belt; a buckle 40 installed in the opposite side of the seat to join with or separate from the tongue plate 30; a height adjusting means 100 installed on side of a roof panel; and a supporting cable 20 for connecting the belt 10 attached to the shoulder of the passenger with the height adjusting means 100.

Figure 2:
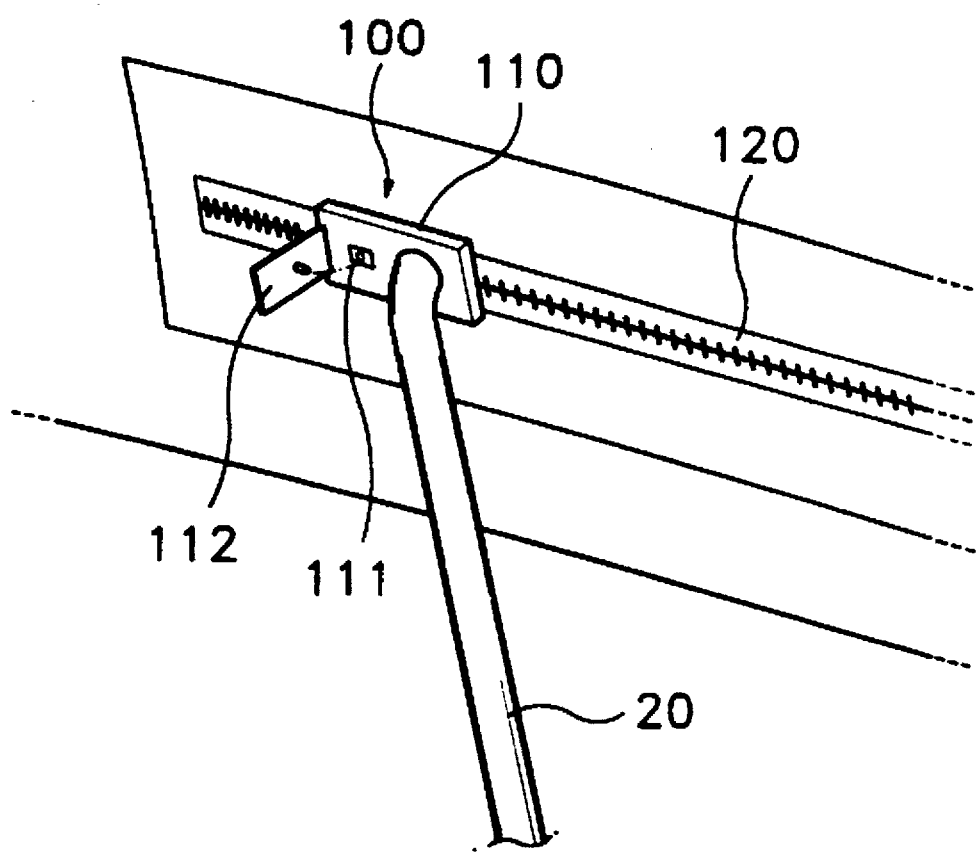
FIG. 2 is a perspective view illustrating a height adjusting device of the seat belt according one embodiment of the present invention.

As illustrated in FIG. 2, the height adjusting means 100 is made up with a zipper body 110 and a zipper guide 120. One side of the zipper body 110 is fixed to one end of the supporting cable 20, and the other side of the zipper 110 has a fixing groove 111. A hooking tip 112 is hinged to connect with or separate from the fixing groove 111. If the hooking tip 112 is inserted and joined with the fixing groove 111, the body of the zipper 110 is fixed so that it does not move along the zipper guide 120.

An operation of the above mentioned seat belt is described here below.

The passenger wears the seat belt by buckling up the tongue plate and then shifting the zipper body 110 of the height adjusting means 100 to a proper position. The belt 10 is shifted upward by the cable 20 connecting the zipper body 110 with the belt 10 in order to loosely cross over the shoulder of the passenger. As the hooking tip 112 is inserted into the fixing groove 111 to fix the zipper body 100, the belt 10 maintains its loose condition.

Another embodiment of the invention is described in detail with reference to FIGS. 3A and 3B.

Figure 3A:
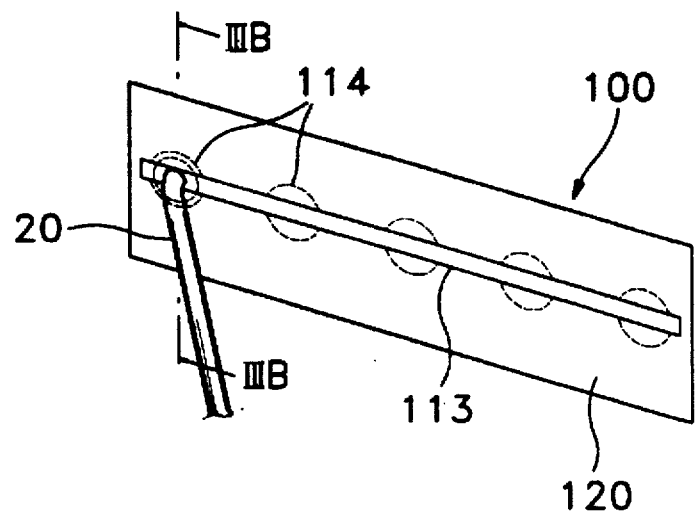
FIG. 3A is a perspective view illustrating the height adjusting device of the seat belt in accordance with another embodiment of the invention.
Figure 3B:
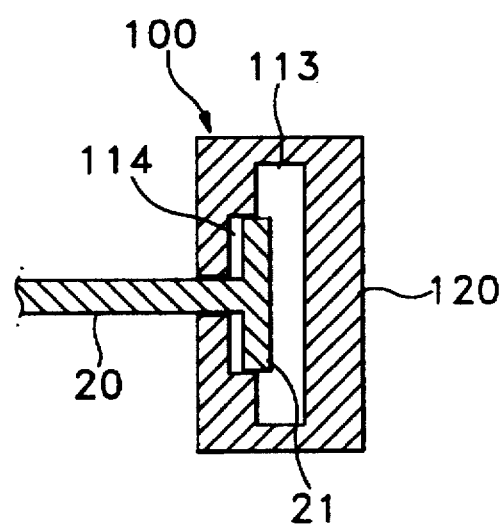
FIG. 3B is a cross sectional view of FIG. 3A taken along line IIIB—IIIB.

As illustrated in FIGS. 3A and 3B, a hooking piece 21 is attached to one end of the supporting cable 20. A guiding groove 113, which guides the movement of the hooking piece 21, is formed in the length direction of height adjusting means 100 in the form of "T" rotated in right angle, and a plurality of fixing pits 114 to fix the hooking piece 21 are formed in a predetermined space apart along the guiding groove 113.

Therefore, the hooking piece 21 of the supporting cable 20 moves along the guiding groove 113, so that the piece is hooked in one of the fixing pits 114 and thus the belt 10 separates from the shoulder of the passenger.

The invention makes the passenger feel comfortable when the passenger wears the seat belt because it gives no pressure to the shoulder of the passenger.

Although the invention has been show and described with respect to its preferred embodiments, it should be understood by those skilled in the art that the foregoing and various other changes, omission and additions in the form and detail thereof may be made therein without departing from the spirit and scope of the invention.

What is claimed is:

1. A seat belt for a vehicle, said vehicle having a seat and a B-pillar, said seat belt comprising:
    a belt having one end fixable to one side of the seat and another end fixable to the E-pillar, said belt having a tongue plate at one end thereof;
    a buckle fixable to one side of the seat for engagement to said tongue plate;
    a supporting cable for connecting said belt crossing over a shoulder of a passenger and a zipper body;
    wherein one end of said supporting cable is fixed to said zipper body, said zipper body having a fixing groove and a hooking tip, said hooking tip receivable in said fixing groove; and a zipper guide for guiding movement of said zipper body.

2. The seat belt as claimed in claim 1, wherein said zipper guide includes

- a guiding groove for guiding a hooking piece of said supporting cable formed in a longitudinal direction of said zipper guide in a forth of right-angle-rotated "T"; and
- a plurality of fixing pits formed along said guiding groove to fix said hooking piece.

3. The seat belt as claimed in claim 1, wherein said belt includes a first strap for connecting between the B-pillar and said tongue plate and a second strap for connecting between a side of the seat and said tongue plate.

4. The seat belt as claimed in claim 3, wherein said first strap and said second strap are connected at said tongue plate.

* * * * *